Dec. 17, 1957 C. W. HOPKINS 2,816,301
WORK SUPPORTING, GRIPPING AND CENTERING DEVICE
Filed April 13, 1955 2 Sheets-Sheet 1
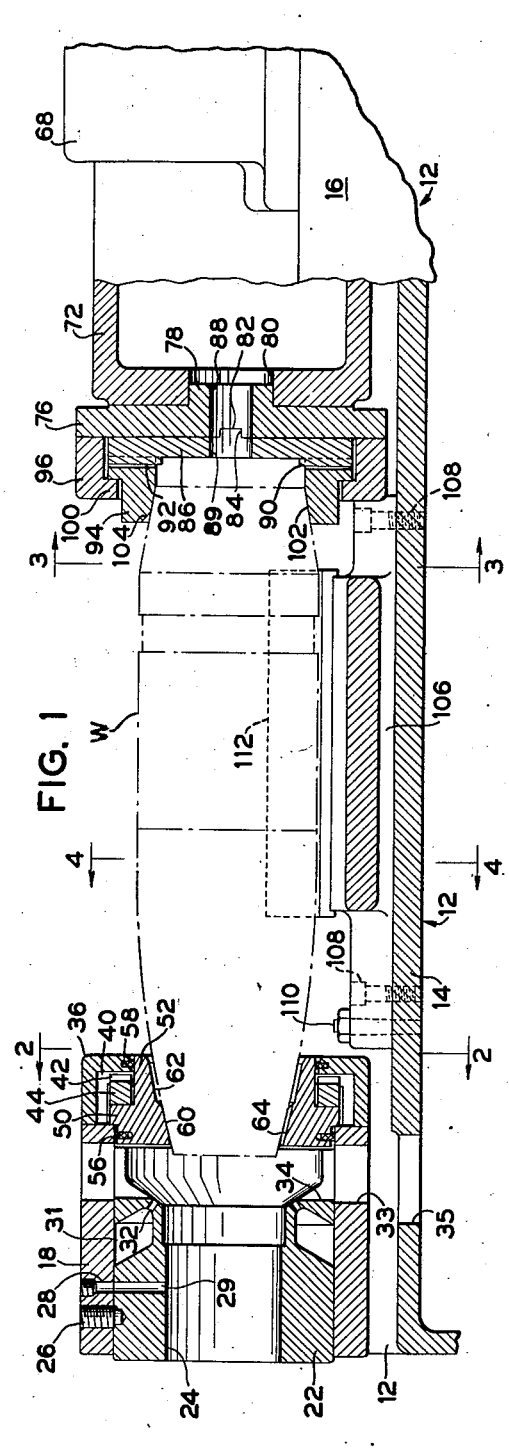
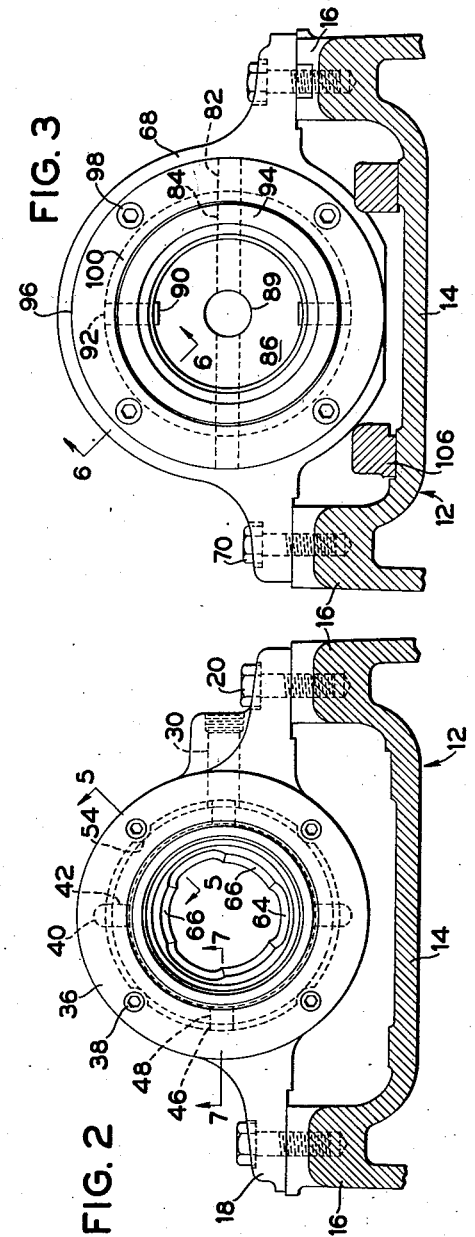
INVENTOR
CECIL W. HOPKINS
ATTORNEYS Dec. 17, 1957     C. W. HOPKINS     2,816,301
WORK SUPPORTING, GRIPPING AND CENTERING DEVICE
Filed April 13, 1955     2 Sheets-Sheet 2

INVENTOR
CECIL W. HOPKINS
BY *Strauch, Nolan & Diggins*
ATTORNEYS

United States Patent Office

2,816,301
Patented Dec. 17, 1957

2,816,301

WORK SUPPORTING, GRIPPING AND CENTERING DEVICE

Cecil W. Hopkins, Waynesboro, Pa., assignor to Landis Machine Company, Waynesboro, Pa., a corporation of Pennsylvania Application April 13, 1955, Serial No. 501,021

3 Claims. (Cl. 10—107)

This invention relates to work holders for metal working machines and more particularly to mechanisms for supporting, centering and gripping a generally cylidrical work piece in a machine for performing machining operations on the ends or interior of the work piece.

While readily adaptable to other types of work, mechanisms of the above general class are particularly suitable for holding artillery shells for internal machining operations and the present invention will be disclosed in a form particularly adapted for such use. In the past the opposite tapered ends of the shell, termed the ogive and rear boat tail, were machined so that by rigidly gripping the shell on these surfaces the interior could be bored and threaded concentric with the outside diameter. Due to recent improvements in shell manufacture it is no longer necessary to machine finish the ogive and rear boat tail concentric with the outside diameter or bourrelet of the shell. Since the internal threads are required to be concentric with the bourrelet, the shell cannot be rigidly gripped on its tapered ends.

Attempts have been made to solve the problem by various devices for gripping the shell on the finished bourrelet so as to center that portion of the shell with the tool employed to machine the interior. Thus concentricity was assured but the disadvantages attendant upon this method have made it highly undesirable. In most cases the gripping area was too distant longitudinally from the ogive end of the shell where the machining operations were being performed, resulting in a loss of rigidity which is particularly important in a threading operation. More important, that portion of the shell designed to fit the bore of the gun was often marked or scarred by the grips and the shell rendered useless.

The device of the present invention obviates the above difficulties by resting the finished bourrelet of the shell on a V support bracket to center it accurately with the tool spindle and gripping the work at its ends to hold it against rotation under the torque of the cut. The gripping devices are constructed to float, that is, to adapt themselves to the center determined by the V support bracket, thus assuring accurate concentricity between the machined internal surfaces and the bourrelet. The work is tightly gripped directly externally of the area in which the machining operations are being carried out and the bourrelet is unmarked by the support bracket. Moreover, in contrast to prior work holding mechanisms, that of the present invention is particularly adaptable to association with automatic loading and unloading devices thus increasing production and substantially reducing the unit cost of the finished work.

An object of the invention is the provision of work holding mechanism effective to center a selected exterior diameter of the work with a tool for performing machining operations on the interior of the work when the centered exterior diameter and portion to be machined are spaced a substantial distance axially of the work.

It is another object of the invention to provide a work holding mechanism combining means for gripping the work on the unfinished ends thereof and means for centering the work on a finished central portion thereof.

It is a further object to provide a work holder having grip means for engaging both ends of the work and means for centering an intermediate portion of the work with an interior or end portion upon which a machining operation is to be performed, the grip means and centering means acting independently of each other.

Another object is to provide floating gripping means as above to permit the work to move radially in any direction under control of the independent centering means.

A still further object of the invention is to provide mechanism as above in which the gripping means is operable in a direction axially of the work.

Other objects and advantages of the invention will be apparent from the following description and the accompanying drawings in which:

Figure 1 is a longitudinal vertical section through the mechanism of the invention;

Figure 2 is a transverse vertical section along line 2—2 of Figure 1;

Figure 3 is a vertical section along line 3—3 of Figure 1;

Figure 4:
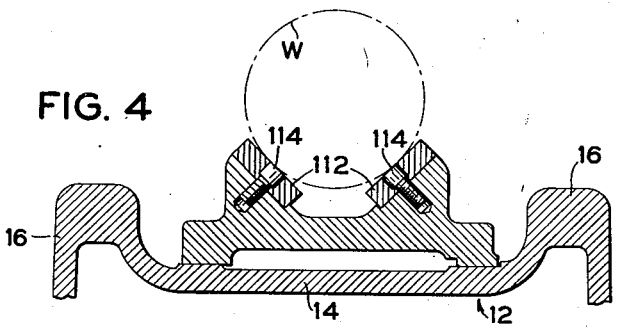
Figure 4 is a vertical section along line 4—4 of Figure 1 with detail omitted beyond the section plane.

The mechanism of the invention may be employed on threading machines of known design having a bed (not shown) supporting a carriage 12 for longitudinal movement thereon toward and away from a rotating thread-cutting tool (not shown). The top of carriage 12 is generally U-shaped in cross-section as shown in Figures 2, 3 and 4 and comprises a central portion 14 and side portions 16. At the forward end of the carriage 12 a bracket 18 is suspended across the depressed central portion 14 and is secured to both upstanding side portions 16 of the carriage by means of screws 20. The bracket 18 is formed as a hollow, cylindrical boss which is accurately centered with respect to the spindle of the machine. A tool bearing member 22 is fitted within bracket 18 and is provided with a finished bore 24 to center and guide the machining tool, in this case a collapsible tap.

To prevent either rotary or axial movement of the bearing member 22, a set screw 26 is threaded radially through the wall of bracket 18 to engage a recess in the bearing member. Aligned passages 28 and 29 are provided through bearing member 22 and bracket 18 respectively to lubricate the bore 24. Another and larger passage 30 is provided, extending radially through the bracket 18 and communicating with an annular recess 31 in the bearing member 22. Coolant supplied through the passage 30 and recess 31, is delivered through a plurality of small openings 32 to the point at which the cutting operation is being performed.

Vertically aligned openings 33, 34 and 35 are provided in the bracket 18, the bearing 22 and the carriage 12, respectively, to permit the escape of coolant and chips to the bed of the machine. If chips collect in the interior of the bearing they may be removed by the insertion of a suitable instrument into the top opening to force the chips out through the lower opening.

As shown in Figures 1, 2, 5 and 7 a cap member 36 is secured to the rear end of bracket 18 by screws 38. The cap member 36 has formed therein two diametrically opposite rectangular recesses 40 extending radially outwardly from its bore to receive the mating rectangular projections 42 formed on one side of the intermediate ring 44 of an Oldham type assembly. The opposite side of the intermediate ring 44 is provided with an additional pair of rectangular projections 46 spaced 90° from the projections 42 and engaging mating recesses 48 (Figure 7) formed in the rearward surface of a shoulder 50 formed as an integral part of a work engaging socket 52.

Figures 7, 8, 9:
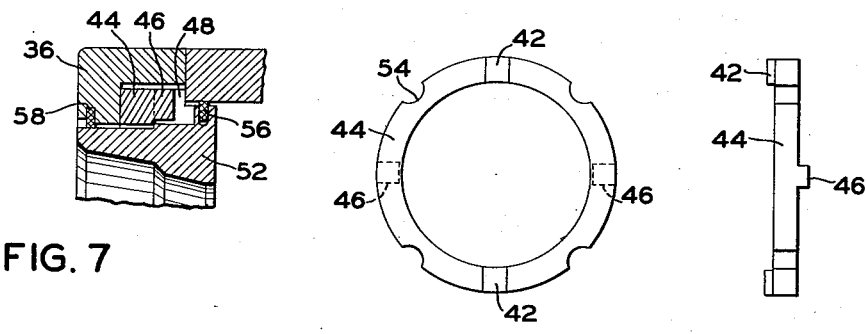
Figure 7 is a partial sectional view along line 7—7 of Figure 2.
Figures 8 and 9 are front and side elevations respectively of an element of one of the gripping mechanisms.

The socket 52 extends rearwardly interiorly of both ring 44 and cap member 36. The socket 52 and ring 44 are prevented from moving axially by being held between the cap member 36 and the rear face of the bracket 18, the latter engaging a shoulder on the socket 52. A substantial amount of diametral clearance is provided between the socket 52, ring 44 and cap member 36 to allow freedom of radial movement of the socket and ring. As seen in Figures 2 and 8, such clearance is also provided as at 54 to prevent the ring 44, in its radial movement, from striking the screws 38. The socket 52 also protrudes forwardly into the bore of the bracket 18 and an annular groove is provided in this portion to receive a sealing member 56 engaging the bore of the bracket 18 to prevent entry of the coolant into the relatively sliding members of the floating work socket. A similar annular groove is provided in the rear portion of cap member 36 to receive a second sealing member 58 engaging the socket 52 to prevent foreign matter from entering between the relatively sliding members from the rear.

The interior of socket 52 is formed in accordance with the work contour. In the instance used for purposes of illustration the work piece is an artillery shell W whose forward end or ogive is engaged by the socket 52. Consequently the socket 52 has a frusto-conical opening 60 closely approximating in section the contour of the work. The rearward portion of the opening 60 is enlarged at 62 to clear the work and thus to limit the area of contact. It is also found desirable at times to limit the contact area further by providing angularly spaced clearances 64 (Figure 2) about the circumference of opening 60. The remaining contact portions 66 may be provided with small, axially-directed serrations to increase gripping effectiveness.

Figures 5, 6:
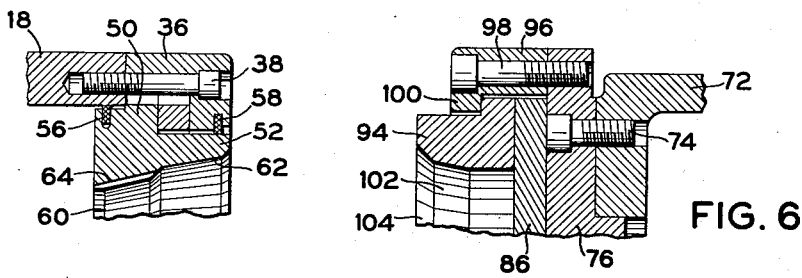
Figure 5 is a partial sectional view along line 5—5 of Figure 2.
Figure 6 is a partial sectional view along line 6—6 of Figure 3.

Spaced axially from bracket 18, a second bracket 68 is mounted on side portions 16 of the carriage 12 and is secured thereto by screws 70. A work-center spindle 72 is journalled for axial movement in bracket 68 and said axial movement may be effected in any known manner, as by a fluid motor for example. The hollow spindle 72 is also made precisely concentric with the tool spindle of the machine and has a circular plate 76 affixed to its forward end by screws 74 (Figure 6). A centering boss 78 is formed integrally on the rear surface of plate 76 to extend into a bore 80 in the forward end of spindle 72, thus insuring concentricity between the spindle 72 and the plate 76.

A rectangular groove 82 is formed diametrically across the face of plate 76 to receive a mating projection 84 formed on the rear surface of an intermediate plate 86. Aligned central openings 88 and 89 are formed through plate 76 and intermediate plate 86 interrupting groove 82 and projection 84. The intermediate plate 86 has integral with its forward face a pair of diametrically opposite, radially extending, rectangular projections 90 disposed 90° from the projection 84 on the opposite face. These projections 90 engage mating rectangular grooves 92 formed in the rear surface of a rear work-engaging socket 94. A cap member 96 secured to plate 76 by screws 98 (Figure 6) engages, with its front flange portion 100, a shoulder on socket 94 to retain this socket and the intermediate plate 86 against axial movement.

The interior of socket 94 is formed as required by the work contour. In the example shown, the socket is adapted to engage the tapered "rear boat tail" of the shell and is therefore formed with a frusto-conical opening 102 matching the taper of the work with an additional and sharper bevel 104 at the forward end of the socket to facilitate entry of the work. The surface 102 may be provided with fine, axially directed serrations to improve the effectiveness of the grip.

As shown in Figures 1 and 4, a work support bracket 106 is mounted in the depressed portion 14 of the carriage 12 between the two work-engaging sockets 52 and 94 and is stationarily secured to the carriage by means of screws 108 and locating pins 110. The bracket 106 forms a substantially V-shaped cradle to the inner sides of which a pair of work locating plates 112 are secured by screws 114. These plates are accurately machined in accordance with the diameter of the finished bourrelet of the work to align the center thereof precisely with the tool spindle and with the bore 24 of the tool bearing 22.

In the operation of the device the spindle 72 and the parts attached thereto are withdrawn axially rearward to provide sufficient space between the work-engaging sockets 52 and 94 to permit the introduction of a work piece from the side or top. This may be done manually or automatically, the work piece coming to rest on the locating plates 112 in accurately centered relation with the tool spindle. The spindle 72 is then moved forward by the above-mentioned power means, the socket 94 engages the work piece and the work is pushed forward firmly into the position shown in Figure 1.

It will be noted that the weight of the work piece is supported only by the bracket 106 and the plates 112. Consequently concentricity between the finished outside diameter of the work and the tool spindle is maintained; the sockets 52 and 94 conform to this location regardless of any eccentricity of those portions of the work upon which they grip, because the floating mechanisms at both ends of the work permit the sockets to move radially in any direction. At the same time the axial pressure upon the work piece causes it to be held against rotation by the sockets while the entire carriage 12 is fed forwardly and the rotating tool enters the bearing 24 and the continued movement of the carriage performs the required machining operation on the work piece. Thereafter the fluid motor is reversed to withdraw spindle 72 and permit the finished work piece to be removed.

From the foregoing it will be apparent that the above stated objects of the invention have been attained by the provision of simple, structurally rugged work holders which effectively support a work piece on a central locating surface without positively gripping or marring said surface. The work piece is accurately located coaxially with a machine tool and is effectively restrained against movement in any direction while a surface remote from the finished locating surface is machined in accurate relation with the locating surface.

Since the rest surfaces which determine the position of the work piece form an upwardly open V upon which the work piece may be deposited without accurate axial location, the work support herein disclosed may be used with automatic loading devices without impairment of accuracy.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a metal working machine having a carriage, a work holder for supporting an elongated work piece on said carriage in predetermined relation with a machine tool comprising, support means including a pair of brackets rigid with said carriage and having central bores aligned with the axis of said machine tool, a tool bearing member received in the bore of one of said brackets, said member having a central tool supporting opening aligned with said machine tool, a first unitary socket having a tapered central opening adapted to engage an end portion of said work piece, an annular member having first guide surfaces in one radial face and second guide surfaces in another radial face normal to said first guide surfaces, said guide surfaces slidably engaging respective mating surfaces on said socket and said support means to thereby support said first grip in radially floating relation with respect to the axis of the machine tool while fixing said grip against axial and rotary movement, a second socket having a central tapered opening for engaging an opposite end portion of said work piece, an annular member having first guide surfaces in one radial face and second guide surfaces in the other radial face normal to said first guide surfaces, said guide surfaces slidably engaging respective mating surfaces on said second socket and said support means, respectively, to thereby support said second socket in radially floating relation with respect to the axis of the machine tool while fixing said second socket against axial and rotary movement, and means providing fixed rest surfaces rigid with said carriage parallel with the axis of said work piece intermediate said brackets for supporting the central portion of said work piece.

2. A work holder for rigidly supporting an elongated work piece of substantially cylindrical section in predetermined relation with a machine tool, said work piece having a locating surface intermediate its ends and tapered end portions in random relation with said locating surface comprising, a rigid frame structure, means providing a pair of fixed rest surfaces on said frame structure parallel to the axis of said machine tool adapted to support said locating surface of said work piece in concentric relation with said machine tool while permitting axial and rotary movement of said work piece, a pair of tapered sockets adapted to grippingly engage the tapered ends of said work piece, a pair of annular members each having first guide surfaces on one radial face and second guide surfaces on the other radial face normal to said first guide surfaces, said guide surfaces slidably engaging mating surfaces on the respective sockets and additional fixed surfaces provided by said frame structure whereby said sockets are non-rotatably supported in said frame structure in radially floating relation with respect to the axis of said machine tool, and means fixing said sockets against axial movement whereby said work piece is positioned in predetermined axial and rotary relation with said machine tool when positioned on said rest surfaces and engaged by said grips.

3. In a metal working machine having a carriage movable toward and away from a machine tool, a work holder for supporting an elongated work piece on said carriage in predetermined relation with said machine tool comprising, a pair of brackets rigid with said carriage and having central bores aligned with the axis of said machine tool, a tool bearing member received in the bore of one of said brackets, said member having a central tool supporting opening aligned with said machine tool, a first unitary grip having a central opening adapted to engage an end portion of said work piece, a first annular member having first guide surfaces in one radial face and guide surfaces in the other radial face normal to said first guide surfaces, said first guide surfaces slidably engaging mating surfaces on said first grip and said second guide surfaces slidably engaging fixed surfaces provided by said one bracket respectively whereby said first grip is non-rotatably supported in radially floating relation with respect to said one bracket, a second unitary grip having a central opening for engaging an opposite end portion of said work piece, a second annular member having first guide surfaces in one radial face and second guide surfaces in the other radial face normal to said first guide surfaces, said guide surfaces slidably engaging mating surfaces on said second grip and fixed surfaces provided by said second bracket respectively whereby said second grip is non-rotatably supported in radially floating relation with said support member, means fixing said grips against axial movement and means providing fixed work rest surfaces rigid with said carriage intermediate said brackets for supporting the central portion of said work piece.

References Cited in the file of this patent
UNITED STATES PATENTS

| | | |
|---|---|---|
| 875,328 | Courtney | Dec. 31, 1907 |
| 1,503,836 | Kunzer | Aug. 5, 1924 |
| 1,582,639 | Cullen | Apr. 27, 1926 |
| 1,881,147 | Thoma | Oct. 4, 1932 |
| 2,063,741 | Hibbard | Dec. 8, 1936 |
| 2,344,622 | Le Tourneau | Mar. 21, 1944 |